(12) United States Patent
Harai (10) Patent No.: US 10,449,969 B2
(45) Date of Patent: Oct. 22, 2019

(54) PARKING PATH CALCULATION DEVICE, PARKING ASSIST DEVICE AND PARKING PATH CALCULATION METHOD

(71) Applicant: Hitachi Automotive Systems, Ltd., Hitachinaka-shi, Ibaraki (JP)

(72) Inventor: Tatsunori Harai, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/769,937

(22) PCT Filed: Oct. 4, 2016

(86) PCT No.: PCT/JP2016/079487
§ 371 (c)(1),
(2) Date: Apr. 20, 2018

(87) PCT Pub. No.: WO2017/068969
PCT Pub. Date: Apr. 27, 2017

(65) Prior Publication Data
US 2018/0312169 A1    Nov. 1, 2018

(30) Foreign Application Priority Data
Oct. 21, 2015   (JP) ................... 2015-207112

(51) Int. Cl.
*B60W 40/10*   (2012.01)
*B60W 30/06*   (2006.01)
(Continued)

(52) U.S. Cl.
CPC ............ *B60W 40/10* (2013.01); *B60R 21/00* (2013.01); *B60W 30/06* (2013.01);
(Continued)

(58) Field of Classification Search
None
See application file for complete search history.

(56) References Cited

U.S. PATENT DOCUMENTS

| | | | |
|---|---|---|---|
| 2014/0057237 A1* | 2/2014 | Chen ................... | B62D 15/028 434/305 |
| 2016/0075329 A1* | 3/2016 | Tomozawa ......... | B62D 15/0285 701/41 |
| 2018/0024564 A1* | 1/2018 | Matsuda ................. | B60R 21/00 701/25 |

FOREIGN PATENT DOCUMENTS

| | | |
|---|---|---|
| DE | 10 2012 216 753 A1 | 3/2014 |
| EP | 1 352 782 A2 | 10/2003 |

(Continued)

OTHER PUBLICATIONS

International Search Report (PCT/ISA/210) issued in PCT Application No. PCT/JP2015/079487 dated Dec. 13, 2016 with English-language translation (Two (2) pages).

(Continued)

*Primary Examiner* — Chico A Foxx
(74) *Attorney, Agent, or Firm* — Crowell & Moring LLP (57) ABSTRACT

Provided are a parking path calculation device, a parking assist device, and a parking path calculation method, which are capable of improving a degree of freedom of calculating a parking path. A parking path calculator calculates a virtual parking position establishing a predetermined positional relationship with a parking end position when an own vehicle moves backward from an own vehicle position to a parking end position at a minimum turning radius, and calculates, depending on a positional relationship between the virtual parking position and the parking end position, a parking path on which steered wheels are to be steered to cross a neutral position thereof at a time of guiding the own vehicle.

10 Claims, 8 Drawing Sheets

(51) Int. Cl.
  *G08G 1/14*    (2006.01)
  *G05D 1/02*    (2006.01)
  *B60R 21/00*   (2006.01)
  *G08G 1/16*    (2006.01)

(52) U.S. Cl.
  CPC .......... *G05D 1/0225* (2013.01); *G08G 1/143* (2013.01); *G08G 1/16* (2013.01)

(56) References Cited

FOREIGN PATENT DOCUMENTS

| | | |
|---|---|---|
| EP | 1 491 429 A2 | 12/2004 |
| EP | 1 491 430 A2 | 12/2004 |
| JP | 2004-210172 A | 7/2004 |
| JP | 2008-201177 A | 9/2008 |
| WO | WO-2014006993 A1 * | 1/2014 ............ B60W 10/04 |

OTHER PUBLICATIONS

Japanese-language Written Opinion (PCT/ISA/237) issued in PCT Application No. PCT/JP2015/079487 dated Dec. 13, 2016 (Four(4) pages).
Extended European Search Report issued in counterpart European Application No. 16857285.7 dated Nov. 2, 2018 (eight (8) pages).

\* cited by examiner

PARKING PATH CALCULATION DEVICE, PARKING ASSIST DEVICE AND PARKING PATH CALCULATION METHOD

TECHNICAL FIELD

The present invention relates to a parking path calculation device, a parking assist device, and a parking path calculation method.

BACKGROUND ART

Some type of parking path calculation device sets a parking path for perpendicular parking as a curve that is based on one-directional steering. An example related to the technology described above is described in Patent Literature 1.

CITATION LIST

Patent Literature

PTL 1: JP 2008-201177

SUMMARY OF INVENTION

Technical Problem

There is a demand for improving a degree of freedom of calculating a parking path in the above-mentioned parking path calculation device.

It is an object of the present invention to provide a parking path calculation device, a parking assist device and a parking path calculation method, which are capable of improving the degree of freedom of calculating a parking path.

Solution to Problem

According to one embodiment of the present invention, a virtual parking position establishing a predetermined positional relationship with a parking end position when an own vehicle is guided from an own vehicle position to the parking end position at a minimum turning radius is calculated, and depending on a positional relationship between the virtual parking position and the parking end position, a parking path on which steered wheels are to be steered to cross a neutral position thereof at a time of guiding the own vehicle is calculated.

Thus according to one embodiment of the present invention, it is possible to improve the degree of freedom of calculating a parking path.

DESCRIPTION OF EMBODIMENTS

First Embodiment

[Configuration of Vehicle]

Figure 1:
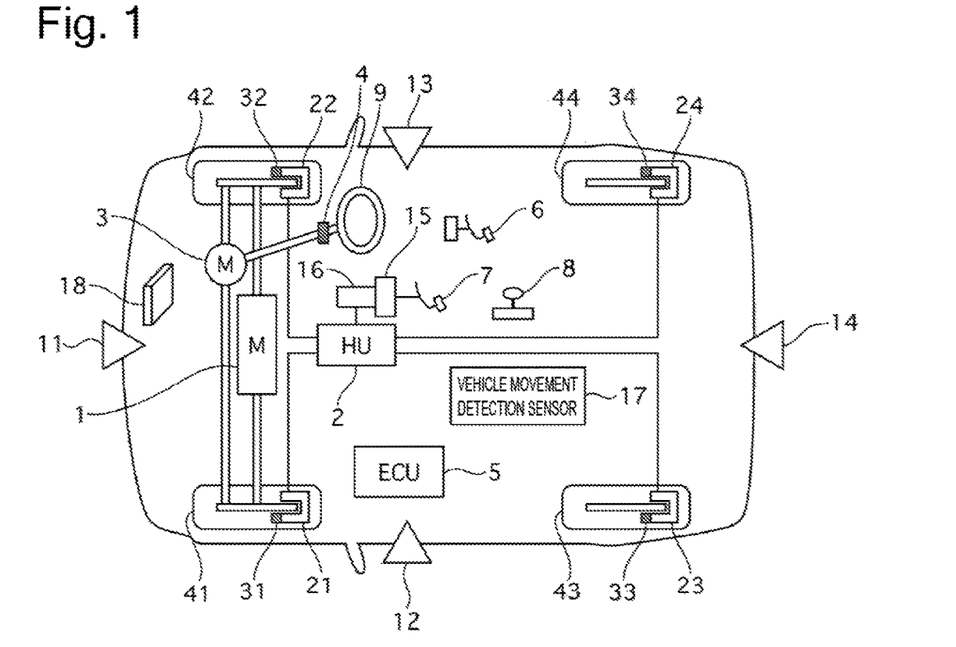
FIG. 1 is a configuration diagram of a vehicle to which a parking assist device is applied.

FIG. 1 is a configuration diagram of a vehicle to which a parking assist device is applied.

A driver uses a shift lever 8 to instruct the vehicle to move forward or backward, or to stop, and uses an accelerator pedal 6 to specify a driving force of a drive motor 1. The drive motor 1 may be an engine. The drive motor 1 can generate a driving force and a braking force independently of accelerator pedal-operation and shift operation by the driver.

A stepping force on the brake pedal 7 is boosted by a brake booster 15, and a hydraulic pressure that depends on the stepping force is generated in a master cylinder 16. The generated hydraulic pressure is supplied to wheel cylinders 21 to 24 via an electric hydraulic brake 2. In this manner, the driver controls the braking force with the brake pedal 7. The electric hydraulic brake 2 incorporates, for example, a pump or an electromagnetic valve to be driven by a motor, and can control braking forces (hydraulic pressures of wheel cylinders 21 to 24) of four wheels independently of brake pedal operation by the driver. There is no difference between left and right braking forces of four wheels due to the brake pedal operation by the driver.

An electric power steering 3 generates an assist torque in accordance with a steering torque input by the driver via a steering wheel 9. Left and right front wheels (steered wheels) 41 and 42 are steered by the steering torque of the driver and the assist torque of the electric power steering 3, and the vehicle turns during the movement. Further, the electric power steeling 3 causes a steering torque independently of steering operation by the driver, and can steer the left and right front wheels 41 and 42.

Further, four cameras 11 to 14 configured to photograph surroundings of the vehicle to recognize objects around the vehicle are mounted at the front, left, right, and, rear positions of the vehicle, respectively. Images picked up by the four cameras 11 to 14 are synthesized for display on a touch panel 18 as a bird's eye view that looks down on the vehicle and the surroundings of the vehicle from the above. The driver can also park the vehicle while looking at the bird's eye view without parking assist control.

The parking assist device according to a first embodiment of the present invention automatically controls the drive motor 1, the electric hydraulic brake 2, and the electric power steeling 3 so that the parking assist device recognizes a parking position based on a parking area and positions of other parked vehicles on images picked up by the cameras 11 to 14 and the vehicle reaches the recognized parking position. The driver can also indicate the parking, position using the touch panel 18 displaying the bird's eye view.

Further, a steering angle sensor 4 and wheel speed sensors 31 to 34 are mounted in order to control the parking path. The electric hydraulic brake 2 performs vehicle skid prevention and anti-lock brake control using sensor signals from a vehicle motion detection sensor 17, which is configured to detect a longitudinal acceleration, a lateral acceleration, and a yaw rate, the steering angle sensor 4, and the wheel speed sensors 31 to 34. At the same time, parking assist control also uses the signals from the steering angle sensor 4 and the wheel speed sensors 31 to 34.

The electric devices described above are all controlled by an electronic control unit 5, and all the sensor signals are input to the electronic control unit 5. The sensor signals include operation amounts given by the driver, such as an accelerator pedal operation amount, a brake pedal operation amount, a shift position, and a steering torque. Further, the function of the electronic control unit 5 can also be divided to implement a configuration in which an electronic control unit is mounted on each electric device and those electronic control units communicate required information to/from one another.

The drive motor 1, the electric hydraulic brake 2, the wheel cylinders 21 to 24, the wheels 41 to 44, and the electronic control unit 5 construct an automatic vehicle speed control device configured to automatically control the vehicle speed. Further, the electric power steering 3 and the electronic control unit 5 construct an automatic steering control device configured to automatically steer the left and right front wheels 41 and 42.

[Configuration of Parking Assist Device]

Figure 2:
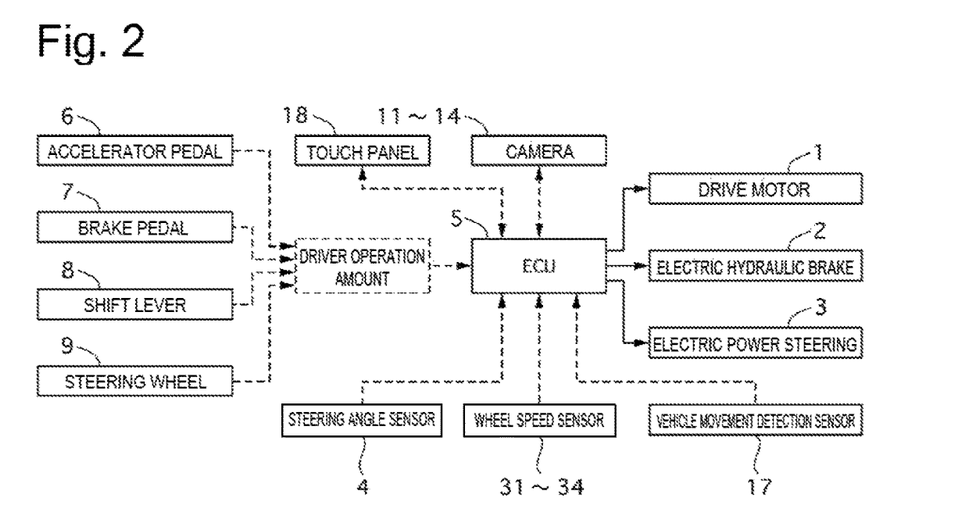
FIG. 2 is a configuration diagram of the parking assist device.

FIG. 2 is a configuration diagram of the parking assist device.

During parking operation, the drive motor 1, the electric hydraulic brake 2, and the electric power steering 3 automatically control movement of the vehicle, and at the same time, the driver operation amount is monitored to enable overriding by the driver. When the driver operates the brake pedal 7, the vehicle is temporarily stopped, and parking operation by automatic control is resumed after the driver releases the brake. With this, when an obstacle has entered the parking path, brake operation by the driver can be prioritized to avoid collision with the obstacle. After that, when operation of the brake pedal 7 is released, parking operation by automatic control is resumed. With this, when an obstacle has moved away from the parking path, it is possible to automatically resume assisting parking. Further, when the driver changes the shift position or the steering torque of the driver becomes equal to or larger, than a predetermined value, parking operation by automatic control is stopped. With this, it is possible to cause the vehicle to move by prioritizing shift operation or steering operation by the driver. The touch panel 18 may display an automatic control stop button on the touch panel 18 so that automatic control can also be stopped by pressing the automatic control stop button.

[Parking Assist Control]

Figure 3:
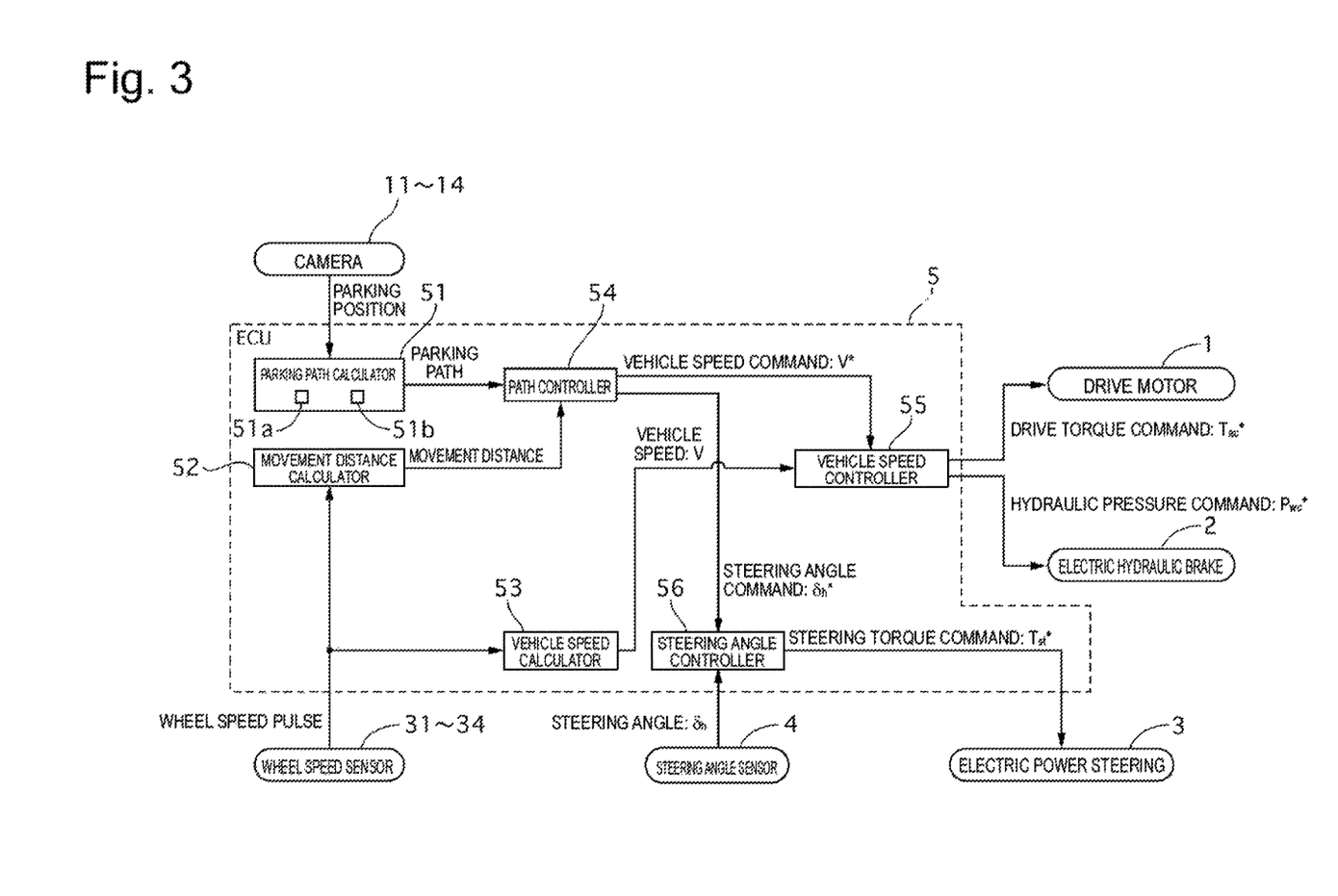
FIG. 3 is a configuration diagram of parking assist control.

FIG. 3 is a configuration diagram of parking assist control in the electronic control unit 5. The electronic control unit 5 includes a parking path calculator 51, a movement distance calculator 52, a vehicle speed calculator 53, a path controller 54, a vehicle speed controller (vehicle controller) 55, and a steering angle controller (vehicle controller) 56 as components for implementing parking assist control.

First, the cameras 11 to 14 recognize a parking position at a position of starting parking operation. As described above, the parking position may be indicated by the driver through the touch panel 18 displaying a bird's eye view. Next, the parking path calculator 51 calculates a parking path based on the parking position. The parking path is calculated when parking operation is started. The parking path is corrected successively during parking operation. Calculation and collection of the parking path are described later.

The wheel speed sensors 31 to 34 generate a wheel speed pulse a plurality of times per rotation of the wheel. The number of times of generation of the wheel speed pulse is integrated for the movement distance calculator 52 to calculate a movement distance of the vehicle. Further, the generation period of the wheel speed pulse is used for the vehicle speed calculator 53 to calculate a vehicle speed V. In the first embodiment, the movement distance and the vehicle speed V are set as a movement distance and a vehicle speed that are measured with respect to a vehicle shaft center of rear wheels, and thus average values of movement distances and wheel speeds of the left and right wheels 43 and 44 are calculated to acquire the movement distance and vehicle speed V, respectively.

The path controller 54 calculates a vehicle speed command (target value of vehicle speed) V* and a steering angle command (target value of steering angle) $\delta h^*$ from the parking path and the movement distance of the vehicle. The vehicle speed command V* at a time when the vehicle is guided to move forward or backward is set to a fixed value.

The vehicle speed controller 55 performs vehicle speed control based on the vehicle speed command V* and the vehicle speed V to acquire, as operation amounts, a drive torque command Tac* to be transmitted to the drive motor 1 and a hydraulic pressure command Pwc* to be transmitted to the electric hydraulic brake 2. The drive motor 1 and the electric hydraulic brake 2 receive those commands to generate a driving force and a braking force. Both of the driving force and the braking force may be generated only by the drive motor 1, or the driving force and the braking force may be generated by the drive motor 1 and the electric hydraulic brake 2, respectively. When the drive motor 1 is replaced with an engine, the latter method may be adopted. In the first embodiment, the drive motor 1 is used instead of an engine, but the driving force and the braking force are generated by the drive motor 1 and the electric hydraulic brake 2, respectively.

The steering angle controller 56 performs steering angle control based on the steering angle command $\delta h^*$ and a steering angle $\delta h$ measured by the steering angle sensor 4 to calculate a steering torque command Tst* as an operation amount. The electric power steering 3 causes a steering torque based on this command.

[Vehicle Speed Control]

Figure 4:
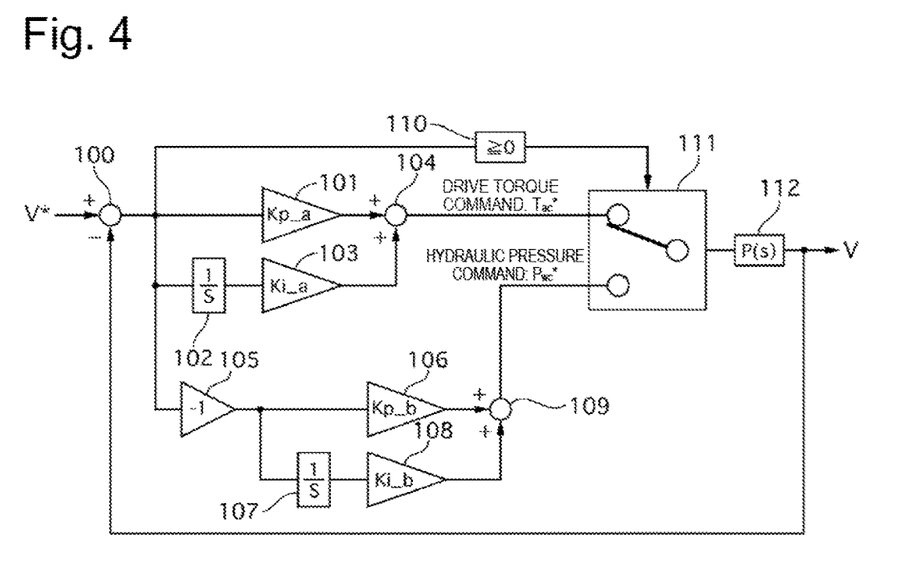
FIG. 4 is a block diagram of control by a vehicle speed controller 55.

FIG. 4 is a block is am of control by the vehicle speed controller 55.

A subtractor 100 outputs a vehicle speed deviation (V*−V) obtained by subtracting the vehicle speed V from the vehicle speed command V*.

A multiplier 101 multiplies the vehicle speed deviation by a proportional gain Kp_a.

An integrator 102 integrates the vehicle speed deviation.

A multiplier 103 multiplies an integral value of the vehicle speed deviation by an integral gain Ki_a.

An adder 104 outputs a sum of outputs of the multipliers 101 and 103 as the drive torque command Tac*.

A multiplier 105 reverses the sip of the vehicle speed deviation.

A multiplier 106 multiplies the vehicle speed deviation with the reversed sign by a proportional gain Ki_b.

An integrator 107 integrates the vehicle speed deviation with the reversed sign.

A multiplier 108 multiplies the integral value of the deviation with the reversed sign by an integral gain Ki_b.

An adder 109 outputs a sum of outputs of the multipliers 106 and 108 as the hydraulic pressure command Pwc*.

When the vehicle speed deviation is equal to or larger than 0, the determiner 110 outputs a link operation selection command of "1" (true), whereas when the vehicle speed deviation is smaller than 0, the determiner 110 outputs a link operation selection command of "0" (false).

A switch 111 outputs the drive torque command Tac* when the link operation selection command output by the determiner 110 is 1, whereas the switch 111 outputs the hydraulic pressure command Pwc* when the link operation selection command output by the determiner 110 is 0.

A plant model (vehicle model) 112 inputs the drive torque command Tac* or the hydraulic pressure command Pwc* to output the vehicle speed V.

As described above, the vehicle speed controller 55 uses the drive motor 1 or the electric hydraulic brake 2 appropriately depending on the sign of the vehicle speed deviation (V*−V) by PI control. When the vehicle speed deviation is equal to or larger than 0, the drive motor 1 is driven by the drive torque command Tac* calculated by using the proportional gain Kp_a and the integral gain Ki_a and the driving force generated by the drive motor 1 causes the vehicle speed V to approach the vehicle speed command V. At this time the hydraulic pressure command Pwc* transmitted to the electric hydraulic brake 2 is set to 0 so as not to generate the braking force. On the other hand, when the vehicle speed deviation is smaller than 0, the electric hydraulic brake 2 is driven by the hydraulic pressure command Pwc* calculated by using the proportional gain Kp_b and the integral gain Ki_b, and the braking force generated by the electric hydraulic brake 2 causes the Vehicle speed V to approach the vehicle speed command V*. At this time, the drive torque command Tac* transmitted to the drive motor 1 is set to 0 so as not to generate the driving force.

[Steering Angle Control]

Figure 5:
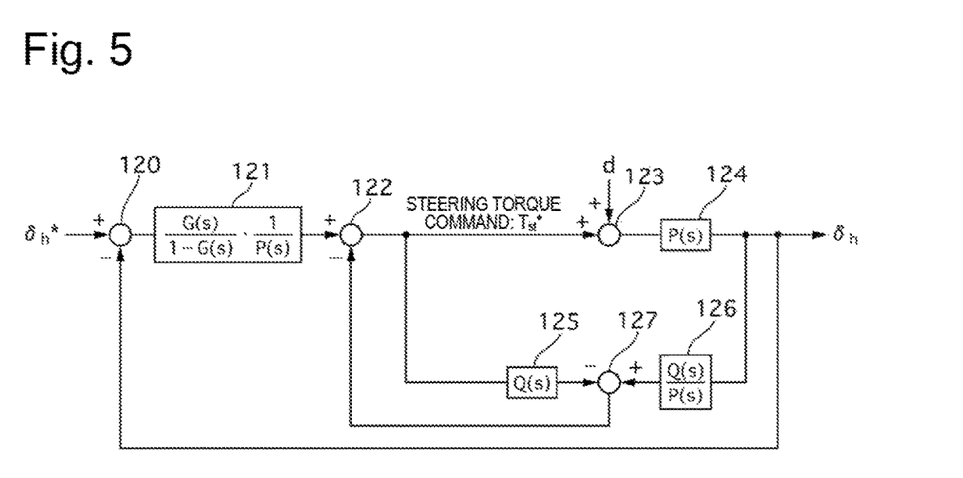
FIG. 5 is a block diagram of control by a steering angle controller 56.

FIG. 5 is a block diagram of control by the steering angle controller 56. The control is two-degree-of-freedom control that uses a disturbance observer configured to cancel a disturbance and a steering angle response can be set freely by using a target response G.

A subtractor 120 outputs a steering angle deviation ($\delta v^*$-$\delta h$) obtained by subtracting the steering angle $\delta h$ from the steering angle command $\delta h^*$.

A model matching compensator 121 is a feedback compensator configured to input the steeling angle deviation, and output an ideal steering torque that causes the steering angle deviation to match a desired target response G given in advance.

A subtractor 122 outputs a steering torque command Tst* obtained by subtracting a disturbance estimation torque from the ideal steering torque.

An adder 123 adds the disturbance d to the steering torque command Tst*.

A plant model (vehicle model) 124 inputs the steering torque command containing the disturbance, and outputs the steering angle $\delta h$.

A noise filter 125 filters the steering torque command Tst* with a low-pass filter.

An inverse plant model 126 filters the steering torque command for producing the steering angle $\delta h$ with the same low-pass filter as that of the noise filter 125.

A subtractor 127 subtracts output of the noise filter 125 from output of inverse plant model 126 to a disturbance estimation torque.

[Calculation of Parking Path]

Figure 6:
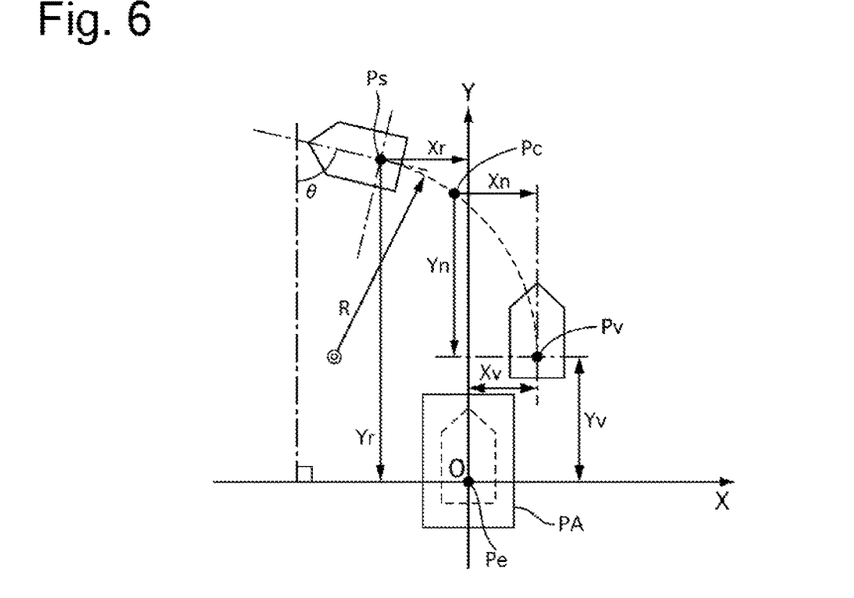
FIG. 6 is a two-dimensional coordinate system in which a parking end position Pe set in a parking area PA serves as an origin O, a Y-axis is set in a front-and-rear direction of an own vehicle at the parking end position Pe with respect to the origin O, and an X-axis orthogonal to the Y-axis is set.

Next, a description is given of calculation and successive correction of the parking path in perpendicular parking. FIG. 6 is a two-dimensional coordinate system in which a parking end position Pe (parking position) in a parking area PA serves as an origin O, a Y-axis is set in a front-and-rear direction of an own vehicle at the parking end position Pe with respect to the origin O, and an X-axis orthogonal to the Y-axis is set. An own-vehicle position (parking start position Ps) side with respect to the X axis is set as a Y-axis positive direction position, and an opposite side thereof is set as a Y-axis negative direction position. An own-vehicle position (parking start position Ps) side with respect to the Y axis is set as an X-axis negative direction position, and an opposite side thereof is set as an X-axis positive direction position.

At the start of parking, the parking path calculator 51 recognizes nearby obstacles, the parking start position Ps, a position and shape of the parking area PA in the two-dimensional coordinate system from the images picked up by the cameras 11 to 14, and sets the parking end position Pe as a central position of the parking area PA. It is assumed that the parking start position Ps and the parking end position Pe are positions (coordinates) that are measured with respect to the vehicle shaft center of rear wheels at respective positions. Next, the parking path calculator 51 uses a virtual parking position calculator 51a to calculate a virtual parking position Pv at which a yaw angle of the own vehicle is 0 (may be substantially 0) when the own vehicle moves backward at a maximum steering angle (minimum turning radius R) from the parking start position Ps toward the parking end position Pe. The yaw angle at this time refers to an angle formed by a direction (Y-axis positive direction) of the own vehicle at the parking end position Pe and the direction of the own vehicle at the own vehicle position (parking start position Ps at time of starting parking), and can be detected from, for example, images picked up by the cameras 11 to 14 or dead reckoning information. The maximum steering angle is a steering angle of the left and right front wheels 41 and 42 at a time when the steering angle controller 56 sets the steering angle command $\delta h^*$ as an upper limit value. When the upper limit value is not set, the steering angle command $\delta h^*$ is a physical upper limit steering angle of the left and right front wheel 41 and 42, which is determined by a rack stopper.

Next, the parking path calculator 51 calculates a parking path PT for causing the own vehicle to move backward from the parking start position Ps to the parking end position Pe based on a result of comparing the virtual parking position Pv with the origin O. The following description is given separately for each comparison result.

(I) When virtual X-distance Xv≤origin O and virtual Y distance Yv≥origin O

Figure 7:
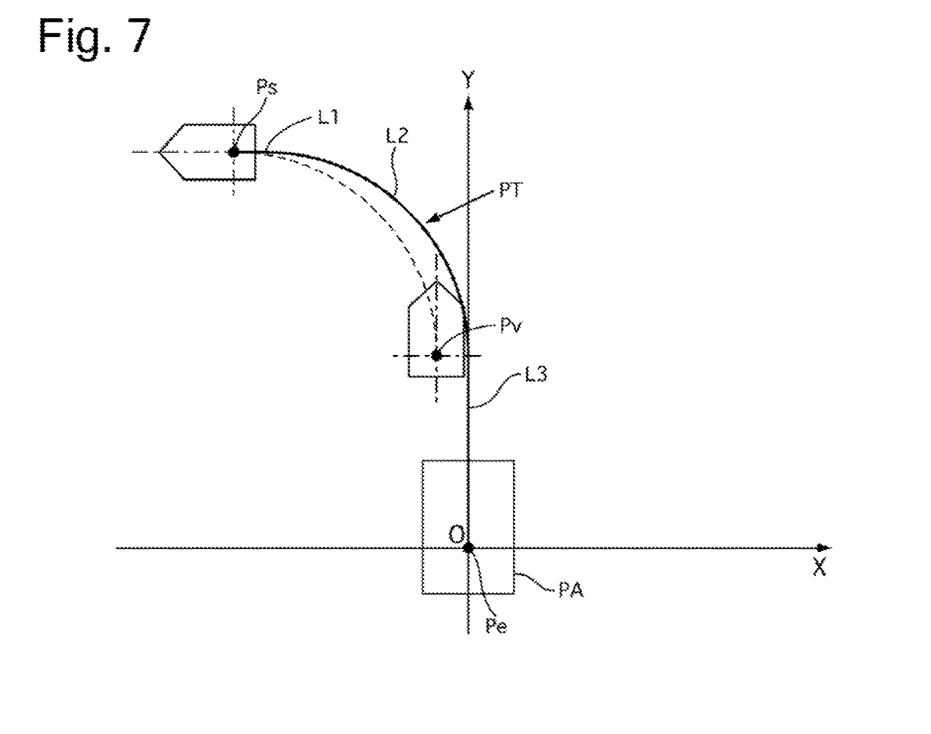
FIG. 7 is an example of a parking path PT in a case where "virtual X-distance Xv≤origin O" and "virtual Y-distance Yv≥origin O" are satisfied.

When a virtual X-distance Xv, which is an X coordinate of the virtual parking position Pv, is equal to or smaller than an X coordinate of 0 of the origin O, and a virtual Y distance Yv, which is a Y coordinate of the virtual parking position Pv, is equal to or larger than a Y coordinate of 0 of the origin O, the parking path calculator 51 calculates the parking path PT as illustrated in FIG. 7. The parking path PT of FIG. 7 is obtained by connecting, in order of from the parking start position Ps to the parking end position Pe, a straight line L1 parallel to the X-axis, a curve L2 of the minimum turning radius R, and a straight line L3 parallel to the Y-axis. A curve having a turning radius larger than the minimum turning radius R and a straight line parallel to the Y-axis may be connected.

(II) When virtual X-distance Xv<origin O and virtual Y distance Yv<origin O

Figure 8:
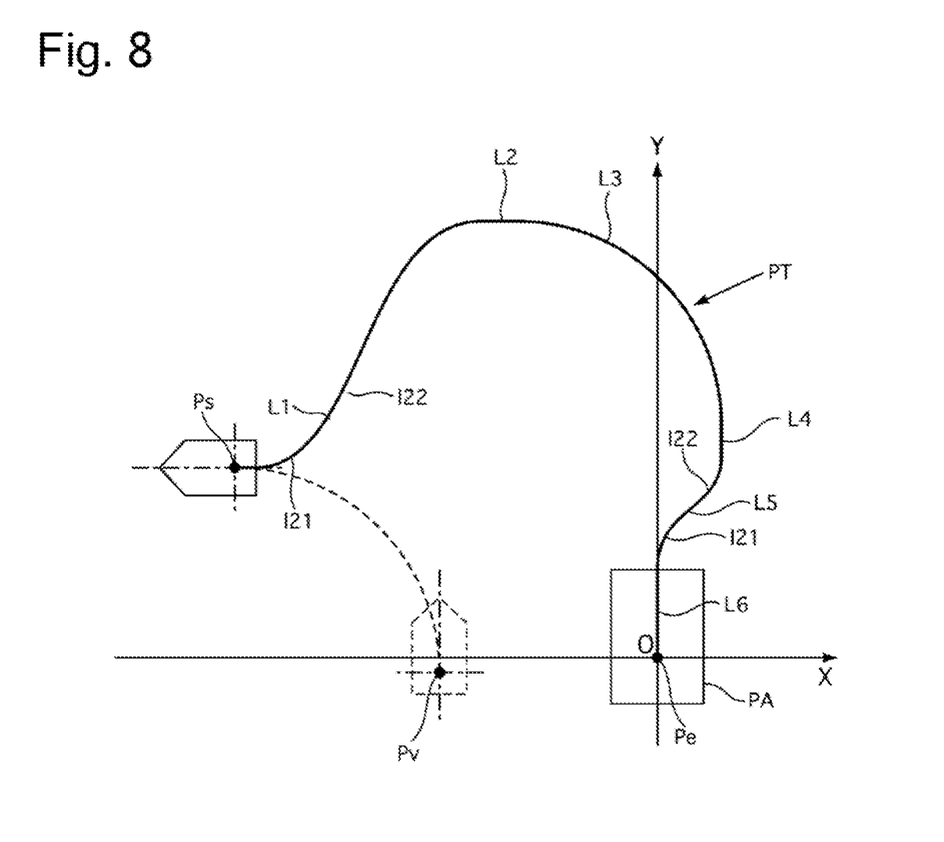
FIG. 8 is an example of the parking path PT in a case where "virtual X-distance Xv≤origin O" and "virtual Y-distance Yv<origin O" are satisfied.

When the virtual X-distance Xv is smaller than the X coordinate of 0 of the origin O and the virtual Y distance Yv is smaller than the Y coordinate of 0 of the origin O, the parking path calculator 51 calculates the parking path PT as illustrated in FIG. 8. The parking path PT of FIG. 8 is obtained by connecting, in order of from the parking start position Ps to the parking end position Pe, a first S-curve L1, a straight line L2 parallel X axis, a curve L3 of the minimum turning radius R, a straight line L4 parallel to the Y-axis, a second S-curve L5, and a line L6 parallel to the Y-axis. The first S-curve L1 is obtained by connecting a first curve 111 that is based on right steering and a second curve 112 that is based on left steering, and both the curves 111 and 112 may be connected by a straight line. The second S-curve L5 is obtained by connecting a second curve 122 that is based on left steering and a first curve 121 that is based on right steering, and both the curves 121 and 122 may be connected by a straight line.

(III) When virtual X-distance Xv>origin O and virtual Y distance Yv>origin O

Figure 9:
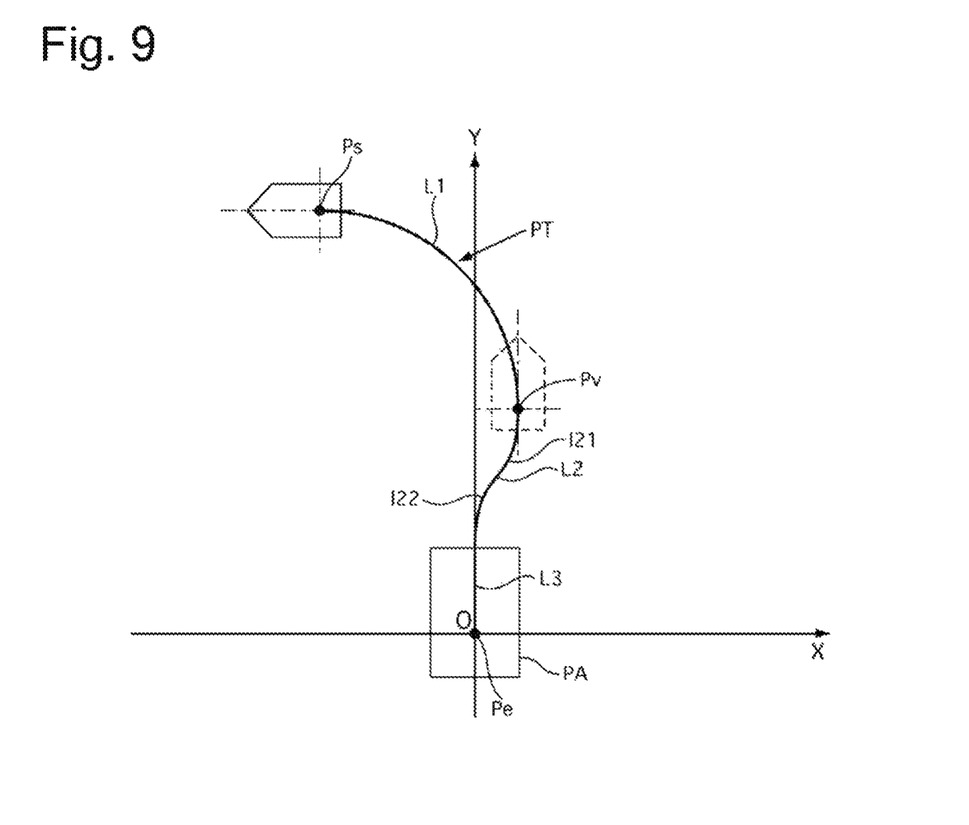
FIG. 9 is an example of the parking path PT in a case where "virtual X-distance Xv>origin O" and "virtual Y-distance Yv>origin O" are satisfied.

When the virtual X-distance Xv is larger than the coordinate of 0 of the origin O and the virtual Y distance Yv is larger than the Y coordinate of the origin O, the parking path calculator 51 calculates the parking path PT as illustrated in FIG. 9. The parking path PT of FIG. 9 is obtained by connecting, in order of from the parking start position Ps to the parking end position Pe, a curve L1 of the minimum turning radius R, an S-curve L2, and a straight line L3 parallel to the Y-axis. The S-curve L2 is obtained by connecting the first curve 121 that is based on left steering and the second curve 122 that is based on right steering, and both the curves 121 and 122 may be connected by a straight line.

Each of the above-mentioned curves is assumed to be an arc, a clothoid curve, a connection of an arc and a clothoid curve, or a curve obtained by connecting a clothoid curve or an arc, a clothoid curve, and a straight line.

During parking operation, namely, during a period from start to end of the parking operation, the parking path calculator 51 successively monitors the position and shape of the parking area PA in the two-dimensional coordinate system from images picked up by the cameras 11 to 14, and when the newly recognized position and shape of the parking area PA are different from stored ones, the parking path calculator 51 updates the position and shape of the parking area PA. Further, when updating the position and shape of the parking area PA, the parking path calculator 51 performs successive correction of setting the parking end position Pe again, and calculating and updating the parking path PT again by replacing the parking start position Ps with a current own vehicle position Pc in accordance with the logics described in (I) to (III).

The parking path calculator 51 calculates, based on the logics described above, the parking path PT for which the own vehicle position Pc matches the parking end position Pe and the yaw angle θ is 0 at the time of completion of parking. When the yaw angle θ cannot be corrected, the parking path calculator 51 calculates the parking path PT for which at least one of the X coordinate or the Y coordinate of the own vehicle position Pc at the time when the vehicle stops in the parking area PA matches coordinates of the parking end position Pe. Thus, in this case, the own vehicle is parked obliquely with respect to the parking area.

[Determination of Calculation of Parking Path]

The parking path PT cannot sometimes be calculated (corrected) depending on the positional relationship between the own vehicle position Pc (parking start position Ps at time of starting parking) and the parking area PA. Thus, before the parking path calculator 51 calculates the parking path PT, a parking path calculation determiner 51b determines whether or not the parking path PT can be calculated based on the relationship between the own vehicle position Pc and the parking end position Pe. When determining that the parking path PT can be calculated, the parking path calculator 51 calculates the parking path PT in accordance with the logics described above. On the other hand, when determining that the parking path PT cannot be calculated, the parking path calculator 51 calculates a parking path PT' for moving back and forth, which causes the own vehicle to move forward from the own vehicle position Pc (parking start position Ps at time of staring parking) to a position at which the parking path PT can be calculated, and outputs the parking path PT' to the path controller 54. In the following, with reference to FIG. 6, a description is given of a method of determining whether or not the parking path PT can be calculated.

First, the parking path calculator 51 refers to a table based on the yaw angle θ to calculate a required X-distance Xn, which is a distance in the X-axis direction between the own vehicle position Pc and the virtual parking position Pv and a required Y distance Yn, which is a distance in the Y-axis direction between the own vehicle position Pc and the virtual parking position Pv. The table is set by acquiring in advance, in an experiment or the like, the required X-distance Xn and the required Y distance Yn for a yaw angle variation amount at the time when the vehicle moves backward at the maximum steering angle. The yaw angle θ at the virtual parking position Pv is 0, and thus the required X-distance Xn and the required Y distance Yr, are acquired by referring to the table with the yaw angle θ at the own vehicle position Pc serving as the yaw angle variation amount.

Next, the parking path calculator 51 calculates a relative X-distance Xr, which is a distance in the X-axis direction between the own vehicle position Pc and the origin O, and a relative Y distance Yr, which is a distance in the Y-axis direction between the own vehicle position Pc and the origin O (Calculate relative XY distance).

Next, the parking path calculator 51 calculates a difference between the required X-distance Xn and the relative X-distance Xr and a difference between the required Y distance Yn and the relative Y distance Yr, to determine that the parking path PT can be calculated when both the differences are smaller than 0, or determine that the parking path PT cannot be calculated when at least one of both the differences is equal to or smaller than 0.

[Processing of Calculating Parking Path]

Figure 10:
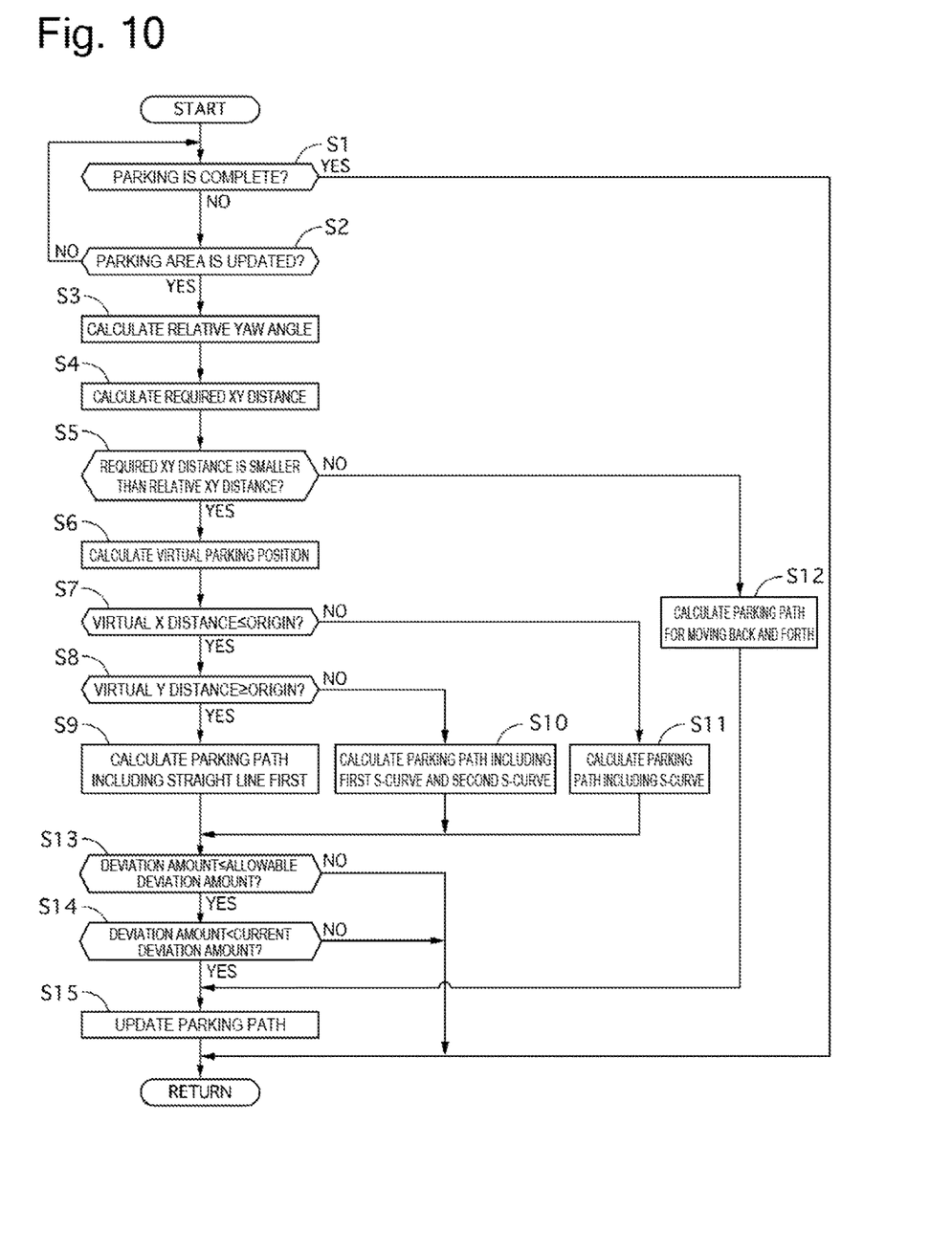
FIG. 10 is a flowchart for illustrating processing of calculating a parking path by a parking path calculator 51.

FIG. 10 is a flowchart for illustrating processing of calculating the parking path by the parking path calculator 51. This flowchart is repeated at predetermined calculation periods from start to end of parking operation.

In Step S1, the parking path calculator 51 determines whether or not parking is complete. When the parking path calculator 51 has made a determination of "NO", the processing proceeds to Step S2. On the other hand, when the parking path calculator 51 has made a determination of "YES", the processing proceeds to "RETURN".

In Step S2, the parking path calculator 51 determines whether or not the position and shape of the parking area PA have been updated. When the parking path calculator 51 has made a determination of "YES", the processing proceeds to Step S3. On the other hand, when the parking path calculator 51 has made a determination of "NO", the processing returns to Step S1.

In Step S3, the yaw angle θ is calculated.

In Step S4, the parking path calculation determiner 51*b* calculates the required X-distance and the required Y distance based on the yaw angle θ (calculates required XY distance).

In Step S5, the parking path calculation determiner 51*b* determines whether or not the required XY distance is smaller than the relative XY distance. When the parking path calculator 51 has made a determination of "YES", the processing proceeds to Step S6. On the other hand, when the parking path calculator 51 has made a determination of "NO", the processing proceeds to Step S12.

In Step S6 the virtual parking position calculator 51*a* calculates the virtual parking position Pv.

In Step S7, the parking path calculator 51 determines whether or not the virtual distance Xv, which is the X coordinate of the virtual parking position Pv, is equal to or smaller than the X coordinate of 0 of the origin O. When the parking path calculator 51 has made a determination of "YES", the processing proceeds to Step S8. On the other hand, when the parking path calculator 51 has made a determination of "NO", the processing proceeds to Step S11.

In Step S8 the parking path calculator 51 determines whether or not the virtual Y distance Yv, which is the Y coordinate of the virtual parking position Pv, is equal to or larger than the Y coordinate of 0 of the origin O. When the parking path calculator 51 has made a determination of "YES", the processing proceeds to Step S9. On the other hand, when the parking path calculator 51 has made a determination of "NO", the processing proceeds to Step S10.

In Step S9, the parking path calculator 51 calculates the parking path PT including the straight line L1 as illustrated in FIG. 7.

In Step S10, the parking path calculator 51 calculates the parking path PT including the first S-curve L1 and the second S-curve L5 as illustrated in FIG. 8.

In Step S11, the parking path calculator 51 calculates the parking path PT including the S-curve L2 as illustrated in FIG. 9.

In Step S12, the parking path calculator 51 calculates the parking path PT' for causing the own vehicle to move forward (back and forth).

In Step S13, the parking path calculator 51 determines whether or not the amount of deviation between a stop position in the parking area in a case where the own vehicle is caused to move along the parking path PT calculated in Step S9 to Step S11 and the parking end position Pe is equal to or smaller than an allowable deviation amount. When the parking path calculator 51 has made a determination of "YES", the processing proceeds to Step S14. On the other hand, when the parking path calculator 51 has made a determination of "NO", the processing proceeds to "RETURN". The allowable deviation amount is set in terms of the X coordinate, the Y coordinate, and the yaw angle θ. For example, the allowable deviation amount is set so as to satisfy an X coordinate allowable deviation amount of 0.1 m, a Y coordinate allowable deviation amount of 0 m, and a yaw angle deviation amount of ±2°.

In Step S14, the parking path calculator 51 determines whether or not the amount of deviation between the stop position in the parking area in a case where the own vehicle is caused to move along the parking path PT calculated in Step S9 to Step S11 and the parking end position Pe is smaller than the amount of deviation between a stop position in the parking area in a case where the own vehicle is caused to move along the current parking path PT and the parking end position Pe. When the parking path calculator 51 has made a determination of "YES", the processing proceeds to Step S15. On the other hand, when the parking path calculator 51 has made a determination of "NO", the processing proceeds to "RETURN".

In Step S15, the parking path PT is updated to the parking path PT calculated in Step S9 to Step S11 or to the parking path. PT' calculated in Step S12.

[Improvement in Degree of Calculation of Parking Path]

The related-art parking path calculation device sets the parking path for perpendicular parking as a curve that is based on one-directional steering. Thus, the related-art parking path calculation device cannot sometimes calculate a parking path for causing the vehicle to park in parallel to and at the center of a parking area depending on a positional relationship between the parking start position and the parking end position, with the result that the vehicle is required to move back and forth. For example, in the scenes illustrated in FIG. 8 and FIG. 9, only the use of the left curve that is based on left steering cannot enable calculation of the parking path for which the yaw angle θ becomes 0 when the Y coordinate of the own vehicle position matches the V coordinate of 0 of the origin O, with the result that the vehicle is required to move back and forth.

In contrast, the parking path calculation device according to the first embodiment calculates the virtual N-distance Xv and the virtual V distance Yv, which are XY coordinates of the virtual parking position Pv at which the yaw angle θ is 0 when the vehicle moves back from the parking start position Ps to the parking end position Pe at the maximum steering angle (minimum turning radius R). Then, when "virtual X-distance Xv<origin O" and "virtual distance Yv<origin O" are satisfied as illustrated in FIG. 8, the parking path calculation device calculates the parking path PT including the first S-curve L1 and the second S-curve L5. Further, when "virtual X-distance Xv>origin O" and "virtual Y distance Yv>origin O" are satisfied as illustrated in FIG. 9, the parking path calculation device calculates the parking path PT including the S-curve L2.

Figure 11:
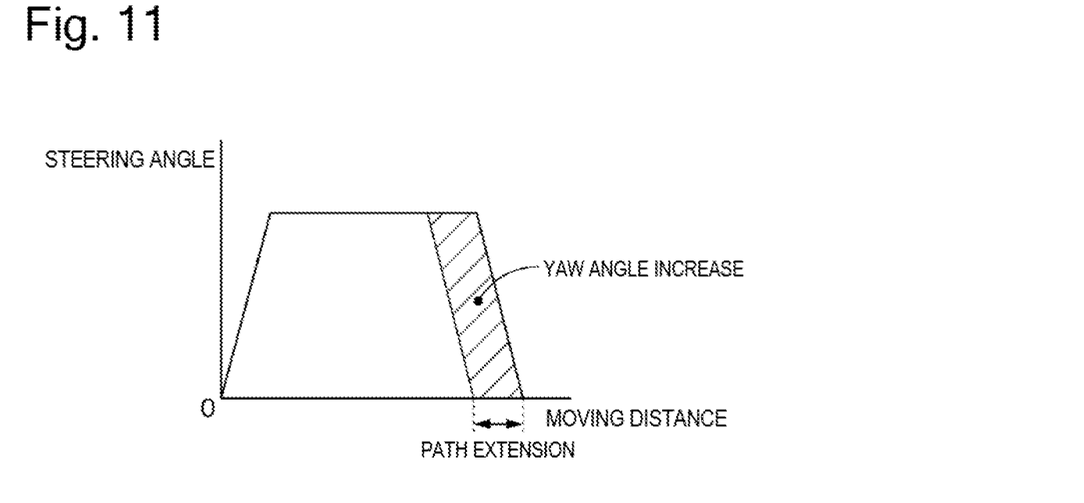
FIG. 11 is a graph for showing a relationship between a moving distance, a steeling angle, and O in a case where the parking path is set as a curve that is based on one-directional steering
Figure 12:
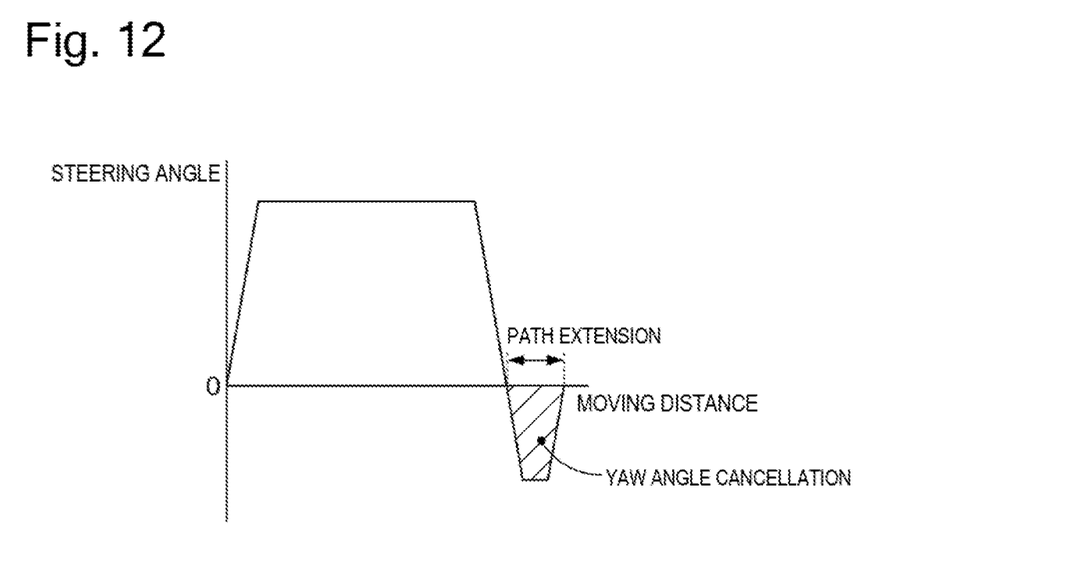
FIG. 12 is a graph for showing a relationship between the moving distance and the steering angle in a case where the parking path is set as an S-curve.

When "virtual X-distance Xv<origin O" and "virtual Y distance Yv<origin O" are satisfied as illustrated in FIG. 8, this means that a Y-axis direction distance between the parking start position Ps and the parking end position Pe is shorter than a Y-axis direction distance required to cause the yaw angle θ to be 0. Thus, the first S-curve L1 is set as the parking path PT and the own vehicle is caused to move in the Y-axis positive direction, to thereby obtain the Y-axis direction distance required to cause the yaw angle θ to be 0. When the own vehicle moves along the calculated parking path PT and readies the straight line L4, the yaw angle θ is 0, but the X coordinate of the own vehicle deviates in the X-axis positive direction with respect to the X coordinate of the parking end position Pe. Thus, a curve (path) for correcting the X coordinate of the own vehicle is required. At this time, as shown in FIG. 11, the yaw angle is increased by extension of the moving path with only the use of the left curve that is based on left steering, and thus the yaw angle at the time when the own vehicle reaches the origin O cannot be set to 0. In the first embodiment, as shown in FIG. 12, the increase in yaw angle θ due to the second curve 122 that is based on left steering can be canceled with the first curve 121 that is based on right steering by setting the parking path PT as the second S-curve S5, to thereby be able to cause the yaw angle θ at the time when the own vehicle reaches the origin O to be 0.

When "virtual X-distance Xv>origin O" and "virtual Y distance Yv≥origin O" are satisfied as illustrated in FIG. 9, this means that, as described above, the yaw angle at the time when the own vehicle reaches the origin O cannot be set to 0 with only the use of the left curve that is based on left steering. Thus, the yaw angle at the time when the OWE vehicle reaches the origin O can be set to 0 by setting the parking path PT as the S-curve L2.

As described above, in the first embodiment, also in the scenes like FIG. 8 and FIG. 9, the parking path PT for perpendicular parking can be calculated, and thus it is possible to improve the degree of freedom of calculating the parking path compared to the related-art parking path calculation device, to thereby reduce the occurrence of a scene requiring the vehicle to move back and forth.

[Improvement of Accuracy of Calculating Parking Path due to Successive Correction during Parking Operation]

The parking area may be found from quite a far place by the cameras 11 to 14, but the cameras 11 to 14 have a problem of, for example, lens distortion. Thus, coordinates of the parking area acquired from a far place do not necessarily have high accuracies. Further, coordinates of the parking area have a backward error of the vehicle. For example, when the own vehicle moves backward with reference to the coordinates of the parking area having a low accuracy, the own vehicle finishes parking on a right or left side of the parking area or with the own vehicle being inclined with respect to the parking area. On the other band, when the cameras 11 to 14 and the parking area are close to one another, coordinates of the parking, area can be acquired accurately. The accuracy of coordinates of the parking area determines the position and angle (yaw angle) of the own vehicle at the time of completion of parking, and thus the own vehicle desirably moves backward using coordinates with the highest accuracy possible.

In view of this, in the first embodiment, coordinates of the parking area are continuously acquired during parking operation, and when the acquired coordinates have higher accuracies and ma comet the parking path PT, the parking path PT is corrected based on the coordinates with higher accuracies. With this, it is possible to improve the accuracy of calculating the parking path PT to the parking end position Pe.

The following effects are exhibited in the first embodiment.

(1) The parking path calculation device includes the parking path calculator 51 configured to: calculate the virtual parking position Pv, at which the own vehicle is parallel to or substantially parallel to the recognized parking position when the own vehicle is guided from the own vehicle position at a maximum steering angle; and calculate the parking path PT for guiding the own vehicle by using, depending an a positional relationship between the virtual parking position Pv and the recognized parking position: a first curve that is based on first-directional steering with respect to a neutral position of a steering device; and a second curve that is based on second-directional steering, which is a steering direction opposite to the first-directional steering with respect to the neutral position (S-curve steering).

Therefore, it is possible to improve the degree of freedom of calculating the parking path PT for perpendicular parking from the own vehicle position Pc to the recognized parking position by including, in the parking path PT, an S-curve that uses the one-directional steering and second-directional steering. Further, it is possible to accurately calculate and correct the parking path PT for perpendicular parking from the own vehicle position Pc to the recognized parking position by calculating the parking path PT during parking operation.

(2) The recognized parking position includes the parking end position Pe.

Therefore, it is possible to improve the degree of freedom of calculating the parking path PT for perpendicular parking from the own vehicle position Pc to the parking end position Pe by including an S-curve in the parking path PT. Further, it is possible to accurately calculate the parking path PT for perpendicular parking from the own vehicle position Pc to the parking end position Pe by calculating the parking path PT during parking operation.

(3) The parking path calculator 51 calculates a parking path from the own vehicle position Pc to the parking end position Pe by using the first S-curve L1, which is a connection of the first curve 111 and the second curve 112, and the second S-curve L5 to be connected to the first S-curve L1, which is a connection of the second curse 122 and the first curve 121, when the virtual X-distance Xv is smaller than the X coordinate of 0 of the origin O and the virtual distance Yv is smaller than the Y coordinate of 0 of the origin O.

In this manner, the parking path PT for perpendicular parking can be calculated even under the above-mentioned scene in which the parking path for perpendicular parking cannot be calculated only with a curve that is based on one-directional steering, by including two S-curves L1 and L2 in the parking path PT. Therefore, the vehicle is not required to move back and forth, which reduces a period of time required for completing parking.

(4) The parking path calculator 51 calculates the parking path PT by using the S-curve L2, which is a connection of the second curve 121 and the first curve 122, when the virtual X-distance Xv is larger than the X coordinate of 0 of the origin O and the virtual V distance Yv is larger than the V coordinate of 0 of the origin O.

In this manner, the parking path PT for perpendicular parking can be calculated even under the above-mentioned scene in which the parking path for perpendicular parking cannot be calculated only with a curve that is based on one-directional steering, by including the S-curve L2 in the parking path PT. Therefore, the vehicle is not required to move back and forth, which reduces a period of time required for completing parking.

(5) The parking path calculator 51 includes the parking path calculation determiner Sib configured to determine whether or not the parking path PT is capable of being calculated based on a positional relationship between the own vehicle position Pc and the recognized parking position.

Therefore, it is possible to reduce unnecessary calculation of the parking path PT by determining whether or not the parking path PT is capable of being calculated.

(6) The parking path calculation determiner 51b determines whether or not the parking path PT is capable of being calculated based on:

a relationship between the required X-distance which is a distance between the virtual parking position Pv and the own vehicle position Pc in the X-axis direction, and the relative X-distance Xr, which is a distance between the own vehicle position Pc and the parking end position Pe in the X-axis direction; and a relationship between the required Y distance Yn, which is a distance between the virtual parking position Pv and the own vehicle position Pc in the Y-axis direction, and the relative Y distance Yr, which is a distance between the own vehicle position Pc and the parking end position Pe in the Y-axis direction.

Therefore, it is possible to determine easily and accurately whether or not the parking path PT can be calculated.

(7) The parking path calculator 51 calculates the parking path PT by using a clothoid curve, a curve, a connection of an arc and a clothoid curve, or a curve obtained by connecting a clothoid curve or an arc, a clothoid curve, and a straight Use of a clothoid curve results in a smooth vehicle movement predictable by the driver, and thus can reduce the sense of strangeness felt by the driver.

(8) The parking path calculation device includes: the virtual parking position calculator 51a configured to calculate the virtual parking position Pv establishing a predetermined positional relationship with the parking end position Pe when the own vehicle is guided from the own vehicle position Pc at the minimum tinning radius R; the parking path calculator 51 configured to calculate, depending on a positional relationship between the calculated virtual parking position Pv and the parking end position Pe, the parking path PT for guiding the own vehicle by connecting a first curve, which is based on first-directional steering being steering in one direction with respect to a neutral position of the left and right front wheels 41 and 42, and a second curve, which is based on second-directional steering being steering in a direction opposite to the one direction with respect to the neutral position; and the vehicle speed controller 55 and steering angle controller 56 configured to move the own vehicle along the calculated parking path PT.

Therefore, it is possible to improve the degree of freedom of calculating the parking path PT for perpendicular parking from the own vehicle position Pc to the recognized parking position by including an S-curve (curve using first-directional steering and second-directional steering) in the parking path PT. Further, it is possible to accurately calculate and correct the parking path PT fore perpendicular parking from the own vehicle position Pc to the recognized parking position by calculating the parking path PT during parking operation.

(9) The virtual parking position Pv, which establishes a predetermined positional relationship with the parking end position Pe when the own vehicle is guided from the own vehicle position Pe at the minimum turning radius R, is calculated, and depending on a positional relationship between the virtual parking position Pv and the parking end position Pe, the parking path PT on which the left and right front wheels 41 and 42 are steered to cross a neutral position thereof at a time of guiding the own vehicle is calculated.

Therefore, it is possible to improve the degree of freedom of calculating the parking path PT fore perpendicular parking from the own vehicle position. Pc to the recognized parking position by including an S-curve (curve using first-directional steering and second-directional steering) in the parking path PT. Further, it is possible to accurately calculate and correct the parking path PT fore perpendicular parking from the own vehicle position Pc to the recognized parking position by calculating the parking path PT during parking operation.

Other Embodiments

The mode for carrying out the present invention has been described above based on the embodiment. However, the specific configuration of the present invention is not limited to the configuration described in the embodiment. A change in design without departing from the scope of the gist of the invention is encompassed in the present invention.

For example, in this embodiment, at the time of calculating the parking path PT, the Y coordinate of the virtual parking position Pv and the Y coordinate of 0 of the origin O are compared with each other. However, when other vehicles are parked on left and right sides of the parking area PA, namely, when the vehicle yaw angle is required to be adjusted in front of the origin O, the predicted parking position Pe to be compared with the virtual parking position Pv may be a point at which the yaw angle is required to be adjusted, for example, a front edge of the parking area in a direction of the front edge of the vehicle. At this time, the relative Y distance Yr for determining whether or not the parking path PT can be calculated is also set with respect to a point at which the own vehicle position Pc and the yaw angle are adjusted, for example, the front edge of the parking area. Further, in the first embodiment, a description is given using moving back of the own vehicle as an example of guiding. However, the own vehicle may be guided to move forward.

The present invention may be configured in the following manner.

(a) In the parking assist device, in the parking path calculation device, when:
    a two-dimensional coordinate system in which coordinates of a parking end position are set as an origin, a front-and-rear direction of the own vehicle at the parking end position is set as a Y-axis, and a direction orthogonal to the Y-axis is set as an X-axis is set; and
    a Y-axis positive direction position, a Y-axis negative direction position, an X-axis negative direction position, and an X-axis positive direction position are defined as a position on a side of the own vehicle position with respect to the X-axis, a position on a side opposite to the position on the side of the own vehicle position with respect to the X-axis, a position on a side of the own vehicle position with respect to the Y-axis, and a position on a side opposite to the position on the side of the own vehicle position with respect to the Y-axis, respectively,
the parking path calculator calculates a parking path from coordinates of the own vehicle position to the coordinates of the parking end position by using a first S-curve, which is a connection of the first curve and the second curve, and a second S-curve to be connected to the first S-curve, which is a connection of the second curve and the first curve, when coordinates of the virtual parking position are at the X-axis negative direction position and the Y-axis negative direction position.

In this manner, the parking path for perpendicular parking can be calculated even under the above-mentioned scene in which the parking path for perpendicular parking cannot be calculated only with a curve that is based on one-directional steering, by including two S-cures in the parking path.

Therefore, the vehicle is not required to move back and forth, which reduces a period of time required for completing parking.

In the parking assist device, the parking path calculator may be configured to calculate the parking path by using an S-curve obtained by connecting the second curve and the first curve when the coordinates of the virtual parking position are at the X-axis positive direction position and the Y-axis positive direction position.

(b) In the parking assist device, in the parking path calculation device, when:

a two-dimensional coordinate system in which coordinates of the parking end position are set as an origin, a front-and-rear direction of the own vehicle at the parking end position is set as a Y-axis, and a direction orthogonal to the Y-axis is set as an X-axis is set; and a Y-axis positive direction position, a Y-axis negative direction position, an X-axis negative direction position, and an X-axis positive direction position are defined as a position on a side of the own vehicle position with respect to the X-axis, a position on a side opposite to the position on the side of the own vehicle position with respect to the X-axis, a position on a side of the own vehicle position with respect to the Y-axis, and a position on a side opposite to the position on the side of the own vehicle position with respect to the Y-axis, respectively, the parking path calculator calculates the parking path by using an S-curve that is obtained by connecting the second curve and the first curve, when coordinates of the virtual parking position are at the X-axis positive direction position and the Y-axis positive direction position.

In this manner, the parking path for perpendicular parking can be calculated even under the above-mentioned scene in which the parking path for perpendicular parking cannot be calculated only with a curve that is based on one-directional steering, by including an S-curve in the parking path. Therefore, the vehicle is not required to move back and forth, which reduces a period of time required for completing parking.

(c) In the parking path calculation method, the calculating of the parking path includes calculating, when:

a two-dimensional coordinate system in which coordinates of the parking end position are set as an origin, a front-and-rear direction of the own vehicle at the parking end position is set as a Y-axis, and a direction orthogonal to the Y-axis is set as an X-axis is set; and a Y-axis positive direction position, a Y-axis negative direction position, an X-axis negative direction position, and an X-axis positive direction position are defined as a position on a side of the own vehicle position with respect to the X-axis, a position on a side opposite to the position on the side of the own vehicle position with respect to the X-axis, a position on a side of the own vehicle position with respect to the Y-axis, and a position on a side opposite to the position on the side of the own vehicle position with respect to the Y-axis, respectively, a parking path from coordinates of the own vehicle position to the coordinates of the parking end position by using a first S-curve, which is a connection of the first curve and the second curve, and a second S-curve to be connected to the first S-curve, which is a connection of the second curve and the first curve, when coordinates of the virtual parking position are at the X-axis negative direction position and the Y-axis negative direction position.

In this manner, the parking path for perpendicular parking can be calculated even under the above-mentioned scene in which the parking path for perpendicular parking cannot be calculated only with a curve that is based on one-directional steering, by including two S-curves in the parking path. Therefore, the vehicle is not required to move back and forth, which reduces a period of time required for completing parking.

(d) In the parking path calculation method, the calculating of the parking path includes calculating, when:

a two-dimensional coordinate system in which coordinates of the parking end position are set as an origin, a front-and-rear direction of the own vehicle at the parking end position is set as a Y-axis, and a direction orthogonal to the Y-axis is set as an X-axis is set; and a Y-axis positive direction position, a Y-axis negative direction position, an X-axis negative direction position, and an X-axis positive direction position are defined as a position on a side of the own vehicle position with respect to the X-axis, a position on a side opposite to the position on the side of the own vehicle position with respect to the X-axis, a position on a side of the own vehicle position with respect to the Y-axis, and a position on a side opposite to the position on the side of the own vehicle position with respect to the Y-axis, respectively, the parking path by using an S-curve, which is a connection of the second curve and the first curve, when coordinates of the virtual parking position are at the X-axis positive direction position and the Y-axis positive direction position.

In this manner, the parking path for perpendicular parking is capable of being calculated even under the above-mentioned scene in which the parking path for perpendicular parking cannot be calculated only with a curve that is based on one-directional steering, by including an S-curve in the parking path. Therefore, the vehicle is not required to move back and forth, which reduces a period of time required for completing parking.

A description has been given of only some embodiments of the present invention, but it is readily understood by a person skilled in the art that various changes and improvements can be made to the exemplified embodiments without practically departing from the novel teachings and advantages of the present invention. Thus, forms to which such changes and improvements are made are also intended to be included in the technical scope of the present invention. The above-mentioned embodiments may be freely combined.

The present application claims a priority based on Japanese Patent Application No. 2015-207112 filed on Oct. 21, 2015. The entire disclosure including Specification, Scope of Claims, Drawings, and Abstract of Japanese Patent Application No. 2015-207112 filed on Oct. 21, 2015 is incorporated herein by reference in their entirety.

REFERENCE SIGNS LIST

41, 42 left and right front wheels (steered wheels), 51 parking path calculator, 51*a* virtual parking position calculator, 51*b* parking path calculation determiner, 55 vehicle speed controller (vehicle controller), 56 steering angle controller (vehicle controller), O origin, Pc vehicle position, Pe parking end position (recognized parking position), PT parking path, Pv virtual parking position, Xn required X-distance, Xr relative X-distance, Yn required Y distance, Yr relative Y distance

The invention claimed is:

1. A parking path calculation device, which is configured to recognize a parking position at which an own vehicle is capable of being parked and calculate a parking path from an own vehicle position to the recognized parking position, the parking path calculation device comprising a parking path calculator configured to:
    calculate a virtual parking position, at which the own vehicle is substantially parallel to the recognized parking position when the own vehicle is guided from the own vehicle position at a maximum steering angle; and
    calculate a parking path for guiding the own vehicle by using, depending on a positional relationship between the virtual parking position and the recognized parking position:
        a first curve that is based on first-directional steering with respect to a neutral position of a steering device; and
        a second curve that is based on second-directional steering, which is a steering direction opposite to the first-directional steering with respect to the neutral position-,
    wherein
    the recognized parking position includes a parking end position, and
    when:
        a two-dimensional coordinate system in which coordinates of the parking end position are set as an origin, a front-and-rear direction of the own vehicle at the parking end position is set as a Y-axis, and a direction orthogonal to the Y-axis is set as an X-axis; and
        a Y-axis positive direction position, a Y-axis negative direction position, an X-axis negative direction position, and an X-axis positive direction position are defined as a position on a side of the own vehicle position with respect to the X-axis, a position on a side opposite to the position on the side of the own vehicle position with respect to the X-axis, a position on a side of the own vehicle position with respect to the Y-axis, and a position on a side opposite to the position on the side of the own vehicle position with respect to the Y-axis, respectively,
    the parking path calculator calculates a parking path from coordinates of the own vehicle position to the coordinates of the parking end position by using a first S-curve, which is a connection of the first curve and the second curve, and a second S-curve to be connected to the first S-curve, which is a connection of the second curve and the first curve, when coordinates of the virtual parking position are at the X-axis negative direction position and the Y-axis negative direction position.

2. A parking path calculation device according to claim 1, wherein the parking path calculator is configured to calculate the parking path by using an S-curve obtained by connecting the second curve and the first curve when the coordinates of the virtual parking position are at the X-axis positive direction position and the Y-axis positive direction position.

3. A parking path calculation device according to claim 1, wherein, when:
    a two-dimensional coordinate system in which coordinates of the parking end position are set as an origin, a front-and-rear direction of the own vehicle at the parking end position is set as a Y-axis, and a direction orthogonal to the Y-axis is set as an X-axis is set; and
    a Y-axis positive direction position, a Y-axis negative direction position, an X-axis negative direction position, and an X-axis positive direction position are defined as a position on a side of the own vehicle position with respect to the X-axis, a position on a side opposite to the position on the side of the own vehicle position with respect to the X-axis, a position on a side of the own vehicle position with respect to the Y-axis, and a position on a side opposite to the position on the side of the own vehicle position with respect to the Y-axis, respectively,
    the parking path calculator calculates the parking path by using an S-curve that is obtained by connecting the second curve and the first curve, when coordinates of the virtual parking position are at the X-axis positive direction position and the Y-axis positive direction position.

4. A parking path calculation device according to claim 1, wherein the parking path calculator includes a parking path calculation determiner configured to determine whether or not the parking path is capable of being calculated based on a positional relationship between the own vehicle position and the recognized parking position.

5. A parking path calculation device according to claim 4, wherein, when a two-dimensional coordinate system in which coordinates of the parking end position are set as an origin, a front-and-rear direction of the own vehicle at the parking end position is set as a Y-axis, and a direction orthogonal to the Y-axis is set as an X-axis is set, the parking path calculation determiner determines whether the parking path is capable of being calculated based on:
    a relationship between a required X-distance, which is a distance between coordinates of the virtual parking position and coordinates of the own vehicle position in an X-axis direction, and a relative X-distance, which is a distance between the coordinates of the own vehicle position and the coordinates of the parking end position in the X-axis direction; and
    a relationship between a required Y-distance, which is a distance between the coordinates of the virtual parking position and the coordinates of the own vehicle position in a Y-axis direction, and a relative Y-distance, which is a distance between the coordinates of the own vehicle position and the coordinates of the parking end position in the Y-axis direction.

6. A parking path calculation device according to claim 1, wherein the parking path calculator is configured to calculate the parking path by using at least one of a clothoid curve, an arc, and a connection of a clothoid curve and an arc.

7. A parking assist device, which is configured to calculate a parking path for parking an own vehicle at a parking end position that is set, the parking assist device comprising:
    a virtual parking position calculator configured to calculate coordinates of a virtual parking position that is a predetermined positional relationship with the parking end position when the own vehicle is guided from an own vehicle position at a minimum turning radius;
    a parking path calculator configured to calculate, depending on a positional relationship between the calculated virtual parking position and the parking end position, a parking path for guiding the own vehicle by connecting a first curve, which is based on first-directional steering being steering in one direction with respect to a neutral position of steered wheels, and a second curve, which is based on second-directional steering being steering in a direction opposite to the one direction with respect to the neutral position; and a vehicle controller configured to move the own vehicle along the calculated parking path, wherein, when:

a two-dimensional coordinate system in which coordinates of the parking end position are set as an origin, a front-and-rear direction of the own vehicle at the parking end position is set as a Y-axis, and a direction orthogonal to the Y-axis is set as an X-axis; and a Y-axis positive direction position, a Y-axis negative direction position, an X-axis negative direction position, and an X-axis positive direction position are defined as a position on a side of the own vehicle position with respect to the X-axis, a position on a side opposite to the position on the side of the own vehicle position with respect to the X-axis, a position on a side of the own vehicle position with respect to the Y-axis, and a position on a side opposite to the position on the side of the own vehicle position with respect to the Y-axis, respectively, the parking path calculator calculates a parking path from coordinates of the own vehicle position to the coordinates of the parking end position by using a first S-curve, which is a connection of the first curve and the second curve, and a second S-curve to be connected to the first S-curve, which is a connection of the second curve and the first curve, when coordinates of the virtual parking position are at the X-axis negative direction position and the Y-axis negative direction position.

8. A parking assist device according to claim 7, wherein, when:

a two-dimensional coordinate system in which coordinates of the parking end position are set as an origin, a front-and-rear direction of the own vehicle at the parking end position is set as a Y-axis, and a direction orthogonal to the Y-axis is set as an X-axis is set; and a Y-axis positive direction position, a Y-axis negative direction position, an X-axis negative direction position, and an X-axis positive direction position are defined as a position on a side of the own vehicle position with respect to the X-axis, a position on a side opposite to the position on the side of the own vehicle position with respect to the X-axis, a position on a side of the own vehicle position with respect to the Y-axis, and a position on a side opposite to the position on the side of the own vehicle position with respect to the Y-axis, respectively, the parking path calculator calculates the parking path by using an S-curve, which is a connection of the second curve and the first curve, when coordinates of the virtual parking position are at the X-axis positive direction position and the Y-axis positive direction position.

9. A parking path calculation method, comprising:

calculating a virtual parking position that is a predetermined positional relationship with a parking end position when an own vehicle is guided from an own vehicle position at a minimum turning radius;

calculating, depending on a positional relationship between the calculated virtual parking position and the parking end position, a parking path on which steered wheels are to be steered to cross a neutral position thereof at a time of guiding the own vehicle, wherein the calculating of the parking path includes calculating, when:

a two-dimensional coordinate system in which coordinates of the parking end position are set as an origin, a front-and-rear direction of the own vehicle at the parking end position is set as a Y-axis, and a direction orthogonal to the Y-axis is set as an X-axis; and a Y-axis positive direction position, a Y-axis negative direction position, an X-axis negative direction position, and an X-axis positive direction position are defined as a position on a side of the own vehicle position with respect to the X-axis, a position on a side opposite to the position on the side of the own vehicle position with respect to the X-axis, a position on a side of the own vehicle position with respect to the Y-axis, and a position on a side opposite to the position on the side of the own vehicle position with respect to the Y-axis, respectively, a parking path from coordinates of the own vehicle position to the coordinates of the parking end position by using a first S-curve, which is a connection of the first curve and the second curve, and a second S-curve to be connected to the first S-curve, which is a connection of the second curve and the first curve, when coordinates of the virtual parking position are at the X-axis negative direction position and the Y-axis negative direction position.

10. A parking assist device according to claim 9, wherein the calculating of the parking path includes calculating, when:

a two-dimensional coordinate system in which coordinates of the parking end position are set as an origin, a front-and-rear direction of the own vehicle at the parking end position is set as a Y-axis, and a direction orthogonal to the Y-axis is set as an X-axis is set; and a Y-axis positive direction position, a Y-axis negative direction position, an X-axis negative direction position, and an X-axis positive direction position are defined as a position on a side of the own vehicle position with respect to the X-axis, a position on a side opposite to the position on the side of the own vehicle position with respect to the X-axis, a position on a side of the own vehicle position with respect to the Y-axis, and a position on a side opposite to the position on the side of the own vehicle position with respect to the Y-axis, respectively, the parking path by using an S-curve, which is a connection of the second curve and the first curve, when coordinates of the virtual parking position are at the X-axis positive direction position and the Y-axis positive direction position.

* * * * *